Patented May 28, 1940

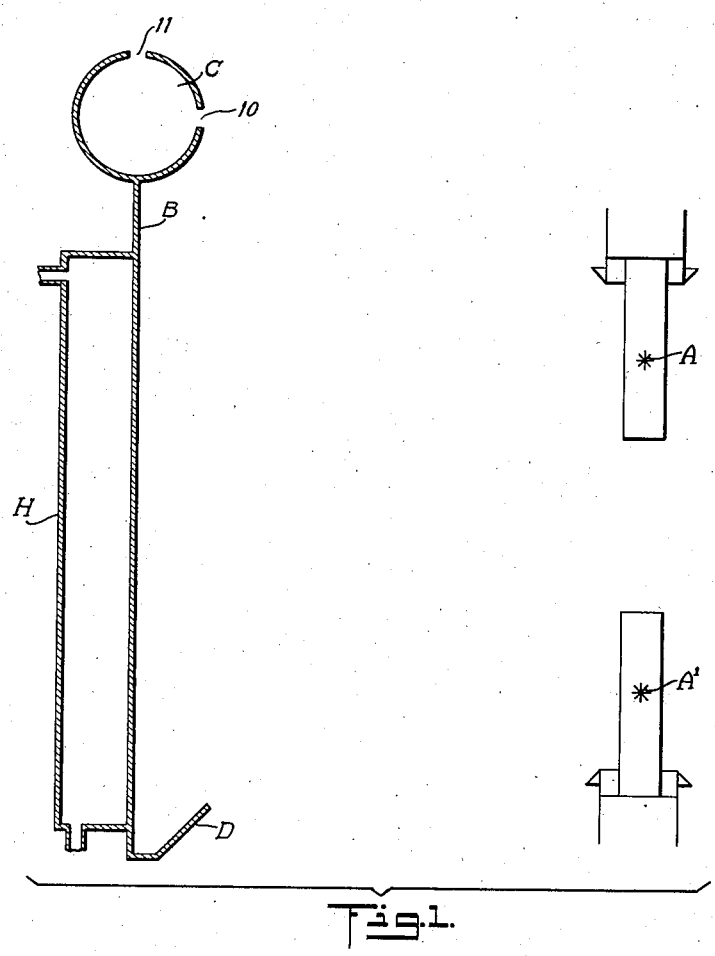
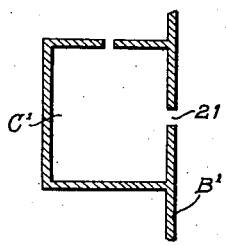

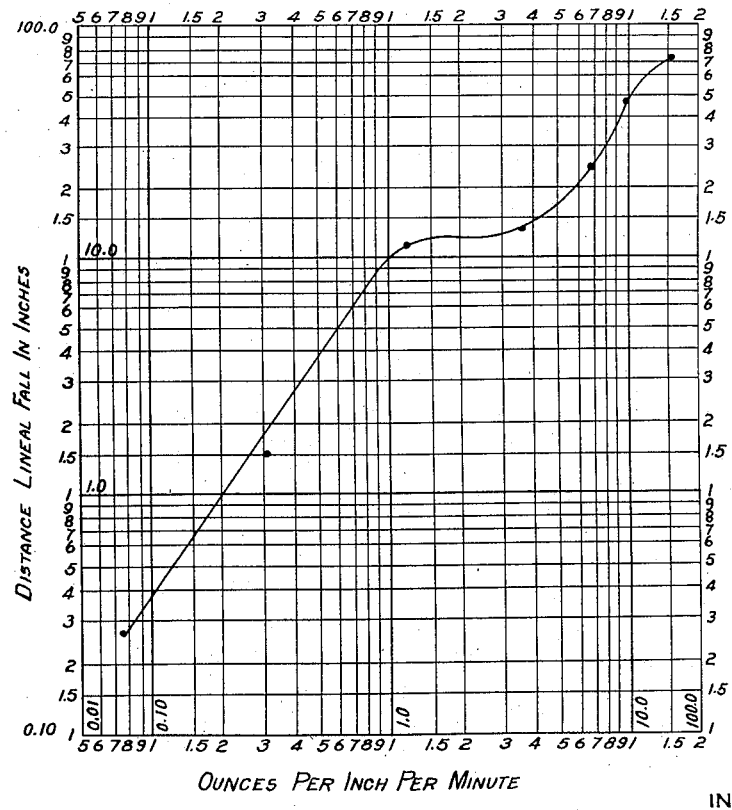

2,202,610

UNITED STATES PATENT OFFICE 2,202,610

METHOD OF AND APPARATUS FOR IRRADIATING LIQUIDS

George C. Supplee, Bainbridge, N. Y., and Merrill J. Dorcas, Berea, Ohio, assignors of one-half to The Borden Company, a corporation of New Jersey, and one-half to National Carbon Company, Inc., a corporation of New York Original application September 21, 1933, Serial No. 690,411. Divided and this application September 28, 1937, Serial No. 166,084

9 Claims. (Cl. 250—49)

This application is a division of our copending application Serial No. 690,411, filed September 21, 1933.

This invention relates to apparatus for the treatment of liquids with radiant energy, such for example as the treatment of milk with ultra-violet radiation for the purpose of increasing the antirachitic properties of the milk or for effecting its bacterial content or to the treatment of a polymerizable oil for the purpose of modifying the body of the oil.

In the irradiating liquids it is important that the effect of the radiant energy be uniformly produced throughout the liquid and that this effect be produced to the proper degree. For example, in milk it is important that substantially all of the milk be acted on by the ultra-violet energy. It is equally desirable that no substantial portion of the milk be excessively exposed to the ultra-violet energy because such excessive exposure would produce undesirable changes that would not be counteracted by dilution with unexposed milk. Examples of such undesirable changes are the formation of undesirable flavor or odor and the destruction of the antirachitic substance, known as vitamin D, by prolonged exposure to the radiation similar to that that originally activated it; other vitamins such as vitamins A and C may also be destroyed by prolonged exposure. It is also desirable that the irradiation be carried through with the minimum amount of apparatus and with the minimum expenditure of energy.

It is well known that exposure of milk for instance to ultra-violet energy results in the development of antirachitic properties in the milk. This is frequently done by exposing milk to ultra-violet energy in the form of a film over a supporting surface. The object of exposing the milk in the form of a film is to provide a large surface for the ultra-violet to act on since it is believed that milk is comparatively opaque to ultra-violet radiation.

We have found that there is a definite relation between the intensity and quality of the incident radiation, the thickness and character of the film of milk, the time of exposure required to produce a given degree of antirachitic potency and the extent of the undesirable results produced by excessive irradiation. We have found that these values are limited by commercial considerations. For instance, the ultra-violet radiation must be of a kind and intensity which is obtainable with the conveniently available sources of ultra-violet; the undesirable flavor or odor must be absent or within the fixed limits imposed by trade requirements; and the fixed concentration of the antirachitic substance or the fixed antirachitic potency must be such as are necessary for successful clinical results with the use of irradiated vitamin D milk. Even within these commercially imposed limits it is possible to carry out the irradiation process with a wide range of types and thicknesses of milk films but we have found that for a given set of required or fixed conditions there are certain types of films and limits of conditions to these films which accomplish the desired results with the least expenditure of ultra-violet energy, with minimum apparatus, with greatest margin of freedom from undesirable flavor and/or odor, and least danger of lack of sufficient antirachitic potency.

An object of our invention is to devise an apparatus for activating or otherwise treating liquids in which the thickness or character of the film being irradiated is maintained at the proper thickness or character in order to secure uniform activation throughout the liquid and produce this maximum desired activation with the minimum of undesirable changes in the liquid. Another object of our invention is to provide means and method for forming a film so that the film thickness and/or character is uniform, at least in a horizontal direction. These and other objects of our invention will be evident from the following specification having reference to the annexed drawings in which, Figure 1 is a diagrammatic representation of a device constructed in accordance with one embodiment of our invention;

Figure 2 is a detailed cross section of a modified distributing device;

Figure 3 is a curve showing the distance of film travel to rate of flow for uniform activation.

In the drawings we show in Figure 1 a surface such as a screen B over which a thin film of liquid to be irradiated is caused to flow by gravity. While the liquid is flowing over the screen B in a thin film it is subject to the radiated energy from any convenient source such as the carbon arcs A and A'. The liquid is supplied to the top of the screen on surface B by means of a distributing member C and is collected in any suitable collecting means such as the trough D. The surface may be provided with a means H for cooling the liquid during irradiation.

We have found that the thickness or character of the film of liquid of the surfaces has a very important effect on the amount of liquid which can be irradiated on a given length of said surface. We have also found that the rates of flow vary with the thickness of the film and of course the amount of liquid which can be irradiated varies with the thickness of the film, the rate of flow of the film, and the time necessary to secure a given degree of activation.

In determining the thickness of the film giving the best and most economical results various phases of the situation were given consideration. It was possible that the film should be of such thickness that all the radiated energy should be completely absorbed. It was also possible that the film should be so thin that the energy could penetrate to the bottom without marked or excessive diminution in intensity. Upon careful experiment we have found neither of these to be the case. Various liquids of varying thicknesses were irradiated for varying lengths of time and the biological activation tested in the usual manner by feeding to laboratory animals.

Although very thin films require a much shorter travel to secure the given degree of activation, yet the amount of milk flowing over the the screen with such thin films is so small that the use of thin films is decidedly uneconomical.

In order that the thickness may be maintained at the desired uniformity and character we have devised a new means for distributing the fluid to be irradiated to the top of the screen. One embodiment of the device constructed in accordance with our invention is shown in Figure 1. The distributing chamber C is provided with a narrow slit 10 and a vent 11. The slit 10 is preferably on the side of the distributing chamber, as for example at the horizontal diameter if the chamber is of circular cross-section but may be slightly spaced therefrom. In no case, however, should it be on the top or bottom. The liquid to be irradiated is supplied to the distributing chamber C by any suitable means which forms no part of the present invention. The liquid is not supplied under any great pressure and does not fill the entire distributing chamber C. The width of the slot 10 is important. This width should not be so great that a film of liquid will not form across it. The exact width is a function of the specific gravity, surface tension and viscosity of the liquid to be irradiated and possibly of other factors. The width of the slot should not be so small that the surface tension of the film will not permit the liquid to flow before it has risen to the vent 11. In using this device the fluid to be irradiated is caused to flow into the chamber C from whence it flows through the slot 10 to the surface B. Due to the fact that the slot 10 is of such width that a surface film can form across it there is no tendency of the liquid to flow until the liquid has reached a height in the chamber C above the top of the slit 10. The amount of liquid flowing may be regulated by varying the amount of liquid supplied to the chamber. This produces a slight change in head between the slot 10 and vent 11. We have found that these very small changes in head in the chamber C produce comparatively great changes in the amount of liquid flowing through the slot onto the screen B. The liquid so flowing follows closely the outside of the chamber C and flows onto the screen B in a very even film.

While we have shown our invention as applied to a device in which the slot of the distributing chamber projects outwardly from the screen, the invention is not so limited. We may provide a slot 21 in a screen B' and build up a chamber C' behind the screen as shown in Figure 2.

While in prior practice it was possible to obtain a comparatively even film some distance down the screen, yet when the distance through which the liquid falls for irradiation is diminished, as it is possible by using the correct film thickness during irradiation, we have found that the projection of even distribution at the start of irradiation becomes of greatly increased importance.

The importance of the even distribution of the liquid on the screen will be evident when it is considered that the amount of energy and time of irradiation are adjusted to give a relatively precise amount of irradiation. It must also be remembered that excess irradiation produced undesirable effects which cannot be restored by dilution and under irradiation lowers the final potency of the product. Hence in order to achieve uniform irradiation it is imperative to provide uniform film thickness. Also, as will be pointed out below, the character of the film is important; such results as are secured by the use of our improved distributing device result in the formation of a film having uniform hydraulic characteristics. Moreover through the determination of proper film thickness and other characteristics and the selection of such optimum conditions we are enabled to shorten the travel of the film of liquid being irradiated to a considerable extent. Since the distance required for a film to assume uniform thickness and other characteristics does not vary considerably it is evident that the ill effect of uneven distribution will be relatively greater in those cases where the film travel is greatly decreased.

The classical methods of hydraulics have developed certain conventional methods of studying and representing the characteristics of flowing films of liquids. As a film of flowing liquid is established over a surface and the thickness of the film is varied it is found that certain changes take place in the character of the motion of individual portion of the liquid. A very thin film of water for instance flowing by the force of gravity over the face of a plate or screen is considered to have all the particles moving in paths substantially parallel to the general direction of the flow and with gradually increasing velocity as the consideration of the rate of motion is moved to particles progressively further removed from the plate. The particles of liquid in actual contact with the plate, because of friction, move only very slowly or not at all. The next layer of particles move with greater speed, the next layer at still greater speed, etc. until the outermost layer of particles at the air surface of the film are moving at the maximum speed. If the average speed of the film is compared with the maximum speed or surface speed it is found that the results can be plotted on a curve as a nearly straight line. As the film of liquid is increased in thickness and as the surface speed is increased there comes a time however, when a new phenomenon appears. The curve as plotted no longer continues as a straight line but flattens out. The film itself, if carefully examined, is seen to be turbulent and the particles are no longer moving in substantially parallel paths of gradually varying velocity. The knee of the curve is considered by this theory of classical hydraulics to be the dividing line between uniform and turbulent flow. This break in the curve for water comes when the ratio of the average speed of all parts of the film to that of surface film is about .8.

While such relationship and figures are fundamental and well known to hydraulic engineers and chemical engineers who design chemical equipment, it does not appear from the literature on the subject that such information concerning milk films is available. The more complex character of the flow curve of milk films compared to the simple curves describing water films is probably explained by the fact that milk is a heterogeneous substance containing a true solution and also colloidal substances such as protein and particles of considerable size such as the fat particles. Aside from the heterogeneous character of milk it is also well known that the surface tension of this substance is likewise substantially different from water and this fact may contribute to the particular characteristics of the curve obtained.

As an illustration of the manner in which we may illustrate the results of our investigation we refer to curve of Figure 3, wherein is plotted on logarithmic coordinates the linear distance through which milk films of different characteristics must fall while being exposed to radiations of given character and intensity to give a constant commercially desirable degree of activation, against the ounces per inch per minute delivered by such films.

From this curve it will be noted that the range defined from approximately a 10 inch exposure to a 24 inch exposure, represents an increase in distance of exposure of only 140% whereas the amount of milk irradiated down such a range increases from substantially 1 ounce per inch per minute to substantially 7 ounces per inch per minute or a 600% increase in volume capacity of the film of the character defined with these limits. At no other place in the curve is the degree of efficiency as great as within the range specified. Within this range it has been found that the amount of milk which can be irradiated to given potency increases almost five times as rapidly as the length of travel required to give such potency.

It is obvious that variations may be made in the details of the apparatus and method for producing uniform film in utilizing our invention. No claim is made in this application to the method of irradiating liquids and apparatus therefor which is being claimed in applicants' copending application Serial No. 253,414, filed January 28, 1939.

We claim:

1. In an apparatus for treating liquids, the combination of means having a surface adapted for flow of the liquid downwardly thereover in the form of a thin continuous flow, said means being provided with a slit therethrough near the top of the surface, through which liquid may be supplied to the said surface; and means providing a receptacle to supply liquid for flow through said slit; said slit being located at an elevation between the top and the bottom of the interior of said receptacle, the sides of the slit being so positioned that the general direction of flow of liquid through the slit is at an angle to the vertical and at an angle to the direction of flow of liquid on said surface, and said slit being substantially as long in a horizontal direction as the width of the continuous thin flow for which the said surface is adapted, and being of such width that the liquid to be treated will always form a film across the slit before the liquid can flow through the slit.

2. An apparatus as defined in claim 1 in which the shape of the surface adjacent the slit is such that liquid flowing beyond the slit is unsupported from beneath.

3. An apparatus as defined in claim 1 in which the liquid is retained in contact with the surface solely by the forces of attraction of the liquid for the surface.

4. An apparatus as defined in claim 1 in which the said surface is a substantially vertical surface and the flow of liquid through the slit is in a generally horizontal direction.

5. A method for producing a thin flow of liquid of controlled thickness over a surface, which comprises maintaining a body of said liquid, emitting liquid from a side of and at an elevation between the top and the bottom of said body of liquid in a direction generally at an angle to the vertical and at an angle to the direction of flow of said liquid over said surface, while retarding forces are operative on the surfaces of the portion of said liquid being emitted, the force applied to emit said liquid being sufficient to cause said liquid to flow against the resistance of said retarding forces but being insufficient to impart momentum such as to cause it to overcome the attraction of said liquid for said surface, whereby the flowing liquid is adherent to the said surface below and immediately adjacent the place of emission.

6. A method as defined in claim 5 in which said emitted liquid is unsupported from beneath immediately after its emission.

7. A method as defined in claim 5 in which the surface is a substantially vertical surface and the liquid is emitted in a substantially horizontal direction.

8. A method for flowing a thin flow of liquid of controlled thickness onto a surface for treatment thereon, comprising flowing the liquid through a slit in the surface, said slit being of such width that the liquid to be treated will always form a film across the slit before the liquid can flow through the slit, while applying sufficient force to said liquid to overcome the retarding force of the film in said slit, but insufficient to impart momentum such as to cause the liquid to separate from the surface immediately adjacent the lower edge of the slit, said force causing the liquid to flow through the slit in a general direction at an angle to the vertical and at an angle to the direction of flow of the liquid on said surface.

9. A method as defined in claim 8 in which the surface is a substantially vertical surface and the liquid flows through the slit in a substantially horizontal direction.

GEORGE C. SUPPLEE.
MERRILL J. DORCAS.